(No Model.)
2 Sheets—Sheet 1.
W. LEONHARDT.
DUMPING COAL WAGON.
No. 580,945.  Patented Apr. 20, 1897.
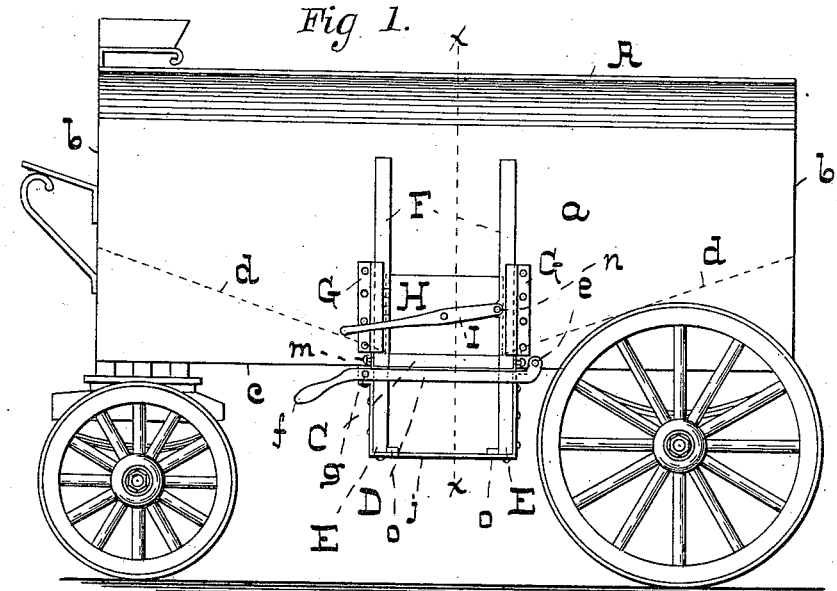
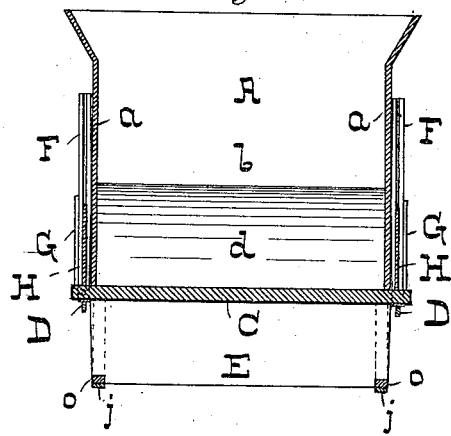
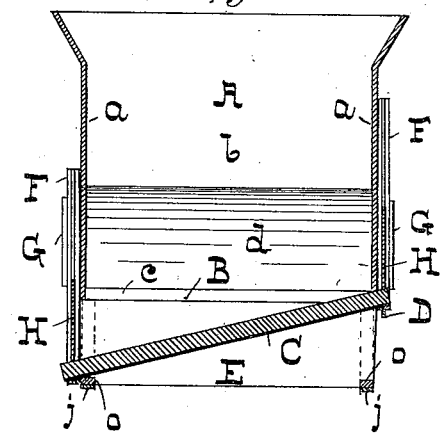
WITNESSES
Dan'l Fisher
Harry Constantine
INVENTOR
William Leonhardt,
by Geo. W. T. Head,
Atty.
THE NORRIS PETERS CO., PHOTO-LITHO., WASHINGTON, D. C.

(No Model.) 2 Sheets—Sheet 2.

W. LEONHARDT.
DUMPING COAL WAGON.

No. 580,945. Patented Apr. 20, 1897.

WITNESSES
Dan'l Fisher
Harry Constantine

INVENTOR
William Leonhardt,
by G. H. W. J. Howard,
atty.

UNITED STATES PATENT OFFICE.

WILLIAM LEONHARDT, OF BALTIMORE, MARYLAND, ASSIGNOR TO LEONHARDT WAGON MANUFACTURING CO., OF SAME PLACE.

DUMPING COAL-WAGON.

SPECIFICATION forming part of Letters Patent No. 580,945, dated April 20, 1897.

Application filed July 13, 1896. Serial No. 598,964. (No model.)

*To all whom it may concern:*

Be it known that I, WILLIAM LEONHARDT, of the city of Baltimore and State of Maryland, have invented certain Improvements in Dumping Coal-Wagons, of which the following is a specification.

In the description of the said invention which follows reference is made to the accompanying drawings, forming a part hereof, and in which—

Figure 4:
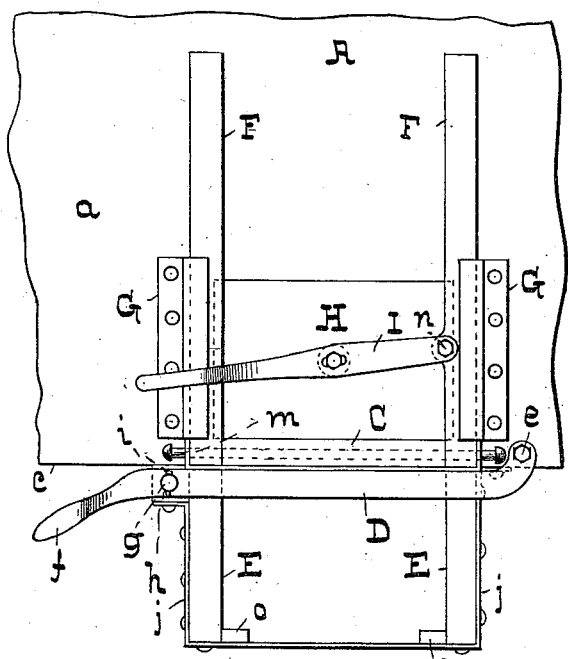
Figure 5:
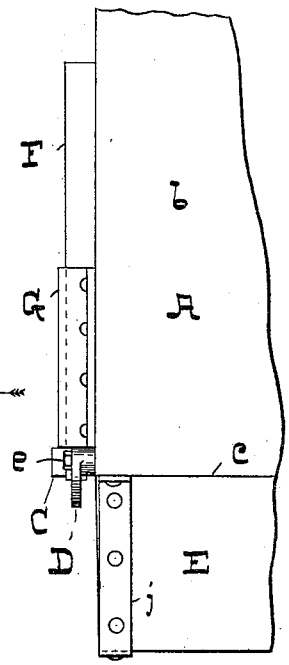
Figure 6:
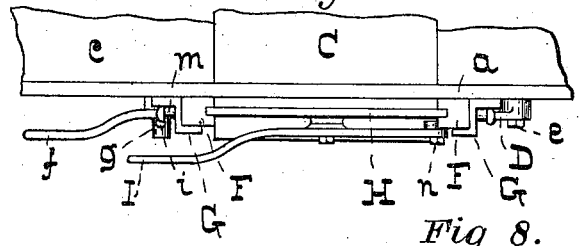
Figure 7:
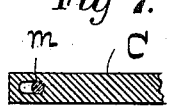
Figure 8:
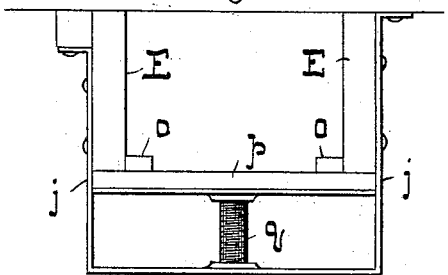

Figure 1 is an exterior side view of the improved dumping-wagon. Fig. 2 is a section of Fig. 1, taken on the dotted line $x\,x$. Fig. 3 is a view similar to Fig. 2, except that certain parts of the wagon are in different relative positions. Fig. 4 is an enlarged view of a portion of Fig. 1. Fig. 5 is a view of Fig. 4 looking in the direction indicated by the arrow. Fig. 6 is a top view of Fig. 4. Fig. 7 is a sectional view of a part of the wagon. Fig. 8 illustrates a modification in the construction of a part of the invention.

Referring now to Figs. 1 to 7, inclusive, A is the body of the wagon, formed of the sides $a$, the ends $b$, and the bottom $c$.

B is an opening in the bottom $c$, extending entirely across the same and situate centrally thereof for the discharge of coal. Leading to this opening are the inclined surfaces $d$. (Shown in dotted lines in Fig. 1 and in full lines in Figs. 2 and 3.) These surfaces effect the complete emptying of the wagon, as will be understood.

C is a subbottom of such size and shape as to close the opening B while the wagon is being loaded and during the transportation of coal to the place of delivery. It is held at such times by the bars D, which are pivoted at $e$ to the sides $a$ of the body. The free end of each of these bars has a handle $f$, and the body is provided with a stud $g$, adapted to pass through a hole $h$ in the bar. When so connected, the handle is protected against disengagement from the stud by a removable pin $i$.

E E are plates situate at the lateral edges of the opening B, and they project downward from the under side of the bottom $c$. These plates, in connection with the subbottom when either of its ends is dropped to its lowest position and made to rest on a strap $j$, form an inclined channel through which coal is discharged.

In Fig. 2 the subbottom is shown as closing the opening B, and in Fig. 3 one end is illustrated as held up while the other is dropped to form a channel, as above described. Each end of the subbottom is provided with two pivoted standards F, which rest against the outside of the body and are arranged to slide in the guides G bolted to the body.

The pivotal connection between the subbottom and the standards consists of a rod $m$. (See particularly Figs. 4 and 7.) The ends of this pivotal rod extend beyond the standards and are used as means for applying a chute (not shown) to the channel and thereby form a continuation thereof. The inner edges of each pair of standards F are grooved to hold a sliding door H, which is raised when coal is to be discharged by means of a lever I, pivoted at $n$ to one of the standards. When the contents of the wagon are to be discharged, the bar D at the side next to the pavement is disconnected at its free end and dropped, together with the end of the subbottom, which carries with it the standards F and their door H. The chute is then hung on the ends of the rod $m$ and the door H opened. After the load of coal is discharged the door H is closed and the dropped end of the subbottom again raised and secured in the position first described by means of the bar D. In order to reduce the shock of the falling subbottom, the straps $j$ are provided with rubber blocks $o$ to receive it.

In Fig. 8 the straps $j$ extend below the edges of the plates E, and a bar $p$ is placed therein to receive the bottom. This bar is adjustable in height by means of a screw $q$ and a nut formed in the strap, so that the angle of inclination of the chute may be changed as desired.

I claim as my invention—

1. In a dumping coal-wagon, the body thereof having a discharge-opening in its bottom and inclined surfaces leading therefrom to the ends of the body, and provided with plates which depend from the bottom and are situated at the lateral edges of the discharge-opening, combined with a loose subbottom, a hinged bar at each side of the body adapted to be brought up under the subbottom to sustain it, means to hold the said bars in a horizontal position, standards pivoted to the ends of the subbottom, suitable guides on the body for the standards, and a sliding door between each pair of standards, substantially as specified.

2. In a dumping coal-wagon, the body thereof having a discharge-opening in its bottom, and inclined surfaces leading therefrom to the ends of the body, and provided with plates which depend from the bottom and are situated at the edges of the discharge-opening, combined with a loose subbottom, devices for securing either or both ends of the subbottom against the bottom of the body, standards pivoted to the ends of the subbottom, suitable guides on the body for the standards, and a sliding door between each pair of standards, substantially as specified.

WILLIAM LEONHARDT.

Witnesses:
DANL. FISHER,
WM. T. HOWARD.